Figure 4:
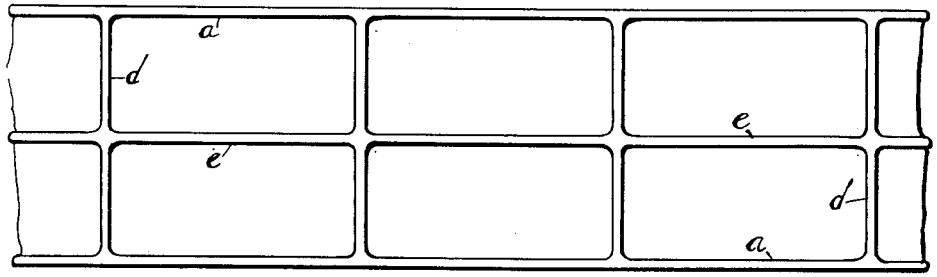
Figure 5:
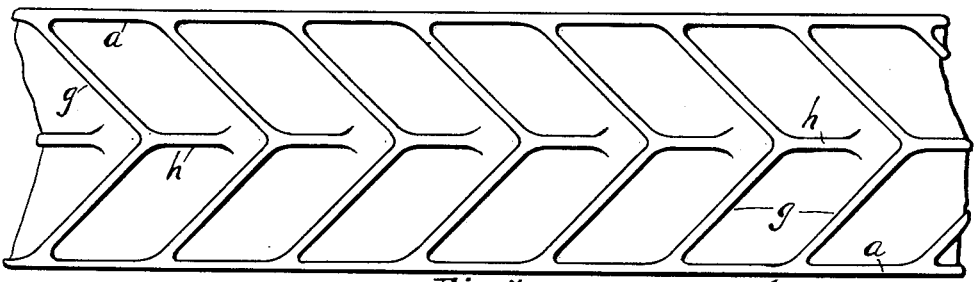
Figure 6:
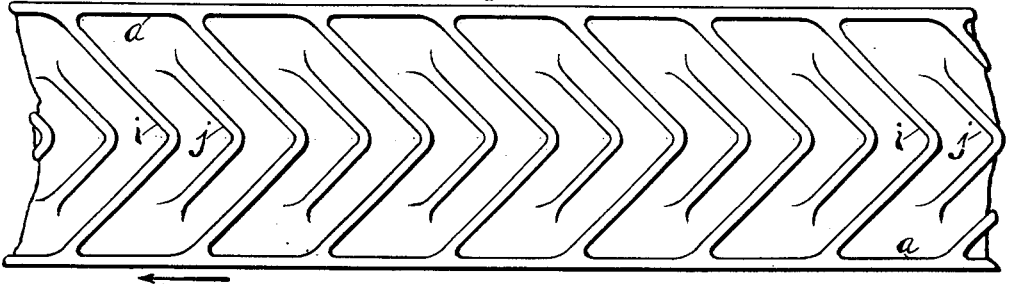
Figure 7:
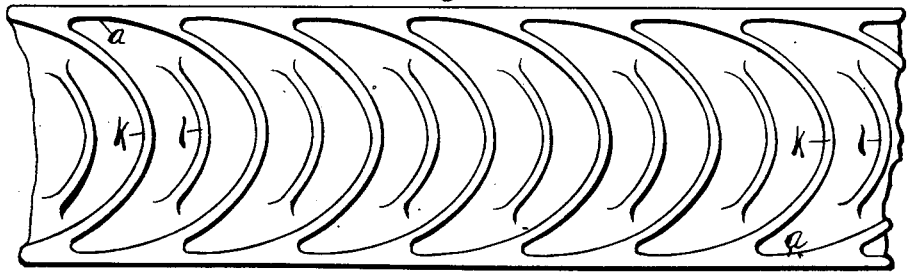

No. 810,510. PATENTED JAN. 23, 1906.
T. ROBINS, Jr.
BELT CONVEYER.
APPLICATION FILED OCT. 10, 1903.
3 SHEETS—SHEET 1.
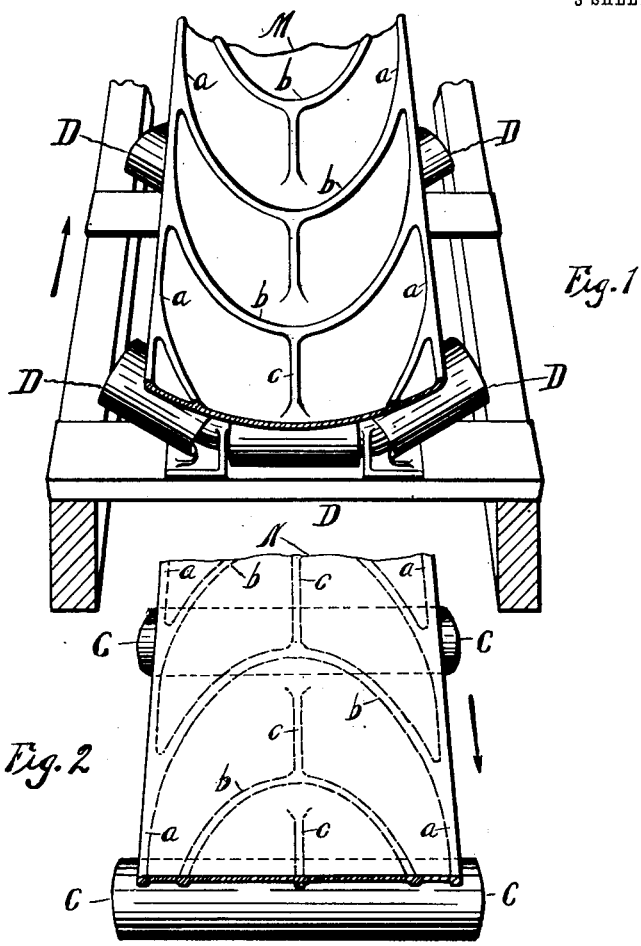
Fig. 1
Fig. 2
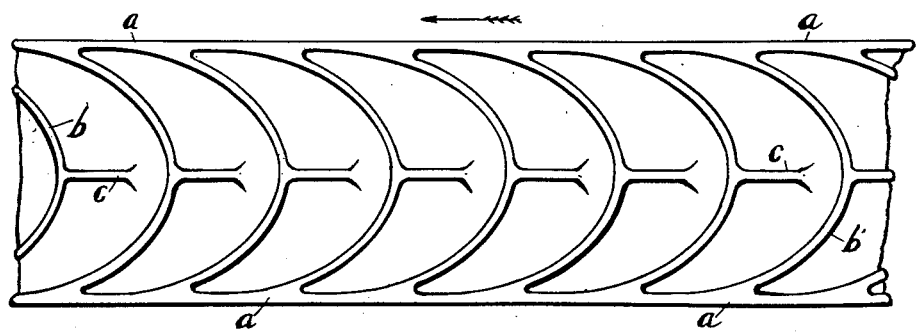
Fig. 3
WITNESSES:
Richard F. Roberts
Frederick Schober Wayne
INVENTOR
Thomas Robins, Jr.
BY
Roscoe F. Peterson
ATTORNEY No. 810,510. PATENTED JAN. 23, 1906.
T. ROBINS, JR.
BELT CONVEYER.
APPLICATION FILED OCT. 10, 1903.

3 SHEETS—SHEET 3.

WITNESSES:
Richard F. Roberts
Frederick Schaber Wayne

INVENTOR
Thomas Robins, Jr.
BY
Rosen T. Peterson
ATTORNEY

UNITED STATES PATENT OFFICE.

THOMAS ROBINS, JR., OF NEW YORK, N. Y., ASSIGNOR TO ROBINS CONVEYING BELT COMPANY, OF NEW YORK, N. Y., A CORPORATION OF NEW JERSEY.

BELT CONVEYER.

No. 810,510.      Specification of Letters Patent.      Patented Jan. 23, 1906.

Application filed October 10, 1903. Serial No. 176,514.

*To all whom it may concern:*

Be it known that I, THOMAS ROBINS, Jr., a citizen of the United States, and a resident of the borough of Manhattan, city, county, and State of New York, have invented certain new and useful Improvements in Belt Conveyers, of which the following is a specification, accompanied by drawings.

My invention relates to conveyers in the operation of which belts of various kinds are used as the carrying medium; and the objects thereof are to improve upon the construction of such conveyers, to facilitate and improve their operation, and especially to increase greatly the angle to the horizontal at which belts may successfully be operated on such conveyers.

The essential features of the invention lie in the provision of a belt conveyer in which an endless belt is stretched tightly between and over two pulleys, one of which is ordinarily the driving-pulley which imparts travel to the belt; in which the upper or carrying portion of the belt between said pulleys is supported upon idler-pulleys adapted to impart a longitudinal trough shape to the belt; in which the lower portion is supported upon what are commonly known as "return" idler-pulleys the faces of which lie in the same plane; in which a snub pulley or pulleys are used to increase the area and pressure of the belt contact on the driving pulley or pulleys, and in which the conveyer-belt is provided on its carrying-surface with a system of ribs, elevations, or ridges presenting elements disposed both longitudinally and transversely of the belt and so arranged that they have a tendency to shift the material carried by the belt toward the middle thereof and that the ribbed or ridged surface of the belt may travel smoothly over the snub-pulleys and return idler-pulleys.

As is well known to all persons familiar with the construction and operation of belt conveyers, it is the common practice in driving conveyer-belts to provide adjacent the driving pulley or pulleys a snub pulley or pulleys, the function of which is to increase the friction between the belt and the driving-pulley and to throw more of the belt in contact with the driving-pulley as it passes over that pulley. This provision is necessary in order to drive a belt of any considerable length, and especially one which is used as a carrying medium, without slippage and consequent loss of driving power. It is also the practice to support the upper or carrying portion of the belt between the end pulleys on idler-pulleys placed transversely of the belt and so shaped or positioned that they turn the sides of that portion of the belt upward, forming a trough which extends longitudinally of the belt. In this way the carrying capacity of the belt is greatly increased and the tendency of the material to roll or slide off the belt at the sides is partially or wholly overcome without the use of skirt-boards or other additional side supports.

In order to lessen the tension on the belt and to assist in keeping it taut, the lower or idle portion is commonly supported on return idler-pulleys which are placed transversely of the belt and are adapted to retain all of its return portion in the same plane.

Figure 11:
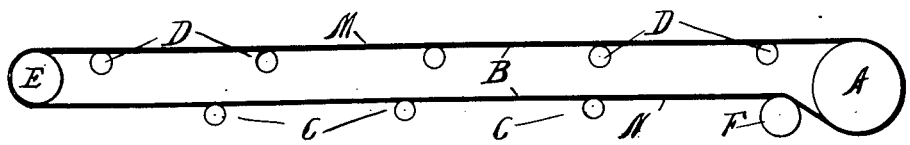

The general arrangement of the driving-pulley, conveyer-belt, and snub and idler-pulleys is diagrammatically illustrated in Fig. 11, in which it is shown that the carrying-surface of the belt must contact with the snub-pulley and the return-idlers.

I am aware that on harvesters, ore concentrators and washers, and the like belts are sometimes used which are provided with ribs, ridges, or depressions of various shapes intended to form a corrugated carrying-surface on the belt; but there are several manifest differences between these classes of belts and the conveyers on which they are used, as compared with my improved conveyer and the belt therefor, in their construction and operation, as well as in the conditions and requirements which they are adapted to meet. The carriers on harvesters and similar machines are so short as not to require snub-pulleys and return-idlers, and as they carry only very light materials the belts are never troughed, but the carrying capacity is increased by the use of skirt-boards. Ore concentrators and washers do not include snub-pulleys and idler-pulleys, and the belts are never troughed, since troughing would interfere with the uses to which these belts are put. In machines of this type the ribs or depressions on the belt are intended to serve as riffles and to assist in distributing the materials on the belt rather than to make it possible to operate the belt at a considerable angle to the horizontal. In harvesters transverse ribs are employed to assist in preventing slippage of the material carried on the belts or aprons; but such ribs are made of wood, metal, or other stiff materials. The ribs or ridges on ore-concentrators and the like are sometimes made flexible; but these belts, whether ribbed or otherwise, are not adapted or intended for troughing. None of the belts above referred to are provided with ribs which are so shaped or positioned as to have a tendency to shift the material carried by the belt toward the middle thereof. From the foregoing it is obvious that these conveyers and their belts are not adapted to meet the requirements imposed upon conveyers which are used for carrying coal, ore, broken stone, and other loose granular materials.

My invention contemplates the use of conveyer-belts provided on their carrying-surfaces with a system of ribs or ridges which will insure the smooth passage of the conveyer-belt over a snub pulley or pulleys and return-idlers, which will permit the troughing of the conveyer-belt to any extent desirable for the effective handling of granular materials of any of the forms above mentioned and others whose handling is determined by the same conditions and which will also crowd the material carried by the belt toward the median line thereof, especially when the belt is operating at a steep incline.

The conveyer-belts generally used in handling materials of the kinds above specified are usually made of canvas or of canvas protected with a coating of rubber. It is to belts of these two types that this invention particularly relates, and the ribs on the carrying-surface of the belt may be successfully made either of canvas or of rubber, according to the nature of the carrying-surface of the belt upon which the ribs are to be placed.

It has been found in the practical operation of conveyer-belts of either of the two types above mentioned that it is impossible to operate belt conveyers successfully when the inclination of the carrying-surface to the horizontal plane is much greater than twenty degrees, for the reason that the material tends to slip upon the surface of the belt when the inclination exceeds the angle mentioned. The angle at which the carrying-surface of the belt may be operated varies somewhat, as will be readily understood, with the nature of the material being handled, as some granular materials slip more readily upon a belt-surface than others; but none of the materials above mentioned may be successfully handled upon smooth-surfaced conveyer-belts at an angle of as much as thirty degrees.

It has been erroneously believed that the difficulty of operating conveyer-belts at an inclination to the horizontal of more than twenty degrees lay not in the slipping of the materials on the surface of the belt, but in the slipping of the material upon itself, it being thought that in granular materials of the forms specified the lowermost particles which came into contact with the conveyer-belt would slip less readily thereon than the upper particles would slip upon the lower particles. Actual test shows, however, that when a belt is provided with a system of ribs or ridges of any of the forms hereinafter to be described the angle to the horizontal at which the carrying-surface of the belt may be disposed and successfully operated is materially greater than that at which the smooth-surfaced belts can be operated in handling materials of the same character.

The increase in the angle of inclination to the horizontal at which the ribbed belt may be successfully operated is particularly noticeable in the handling of coal, ore, and broken stone, the particles of which are irregular in outline and more or less jagged in contour, as in such materials the tendency of the uppermost particles in the layer to slip upon the particles below is very slight.

In describing the invention reference will be had to the accompanying drawings, forming a part of this specification, in which are illustrated a number of different forms of embodiment of the invention all capable of carrying the same into practical operation, it being understood that various changes in the precise manner of arrangement of the ribs and in their construction and mode of attachment to conveyer-belts may be made without departing from the invention or sacrificing any of the advantages thereof.

Similar reference-letters refer to similar parts throughout the several views.

Figure 8:
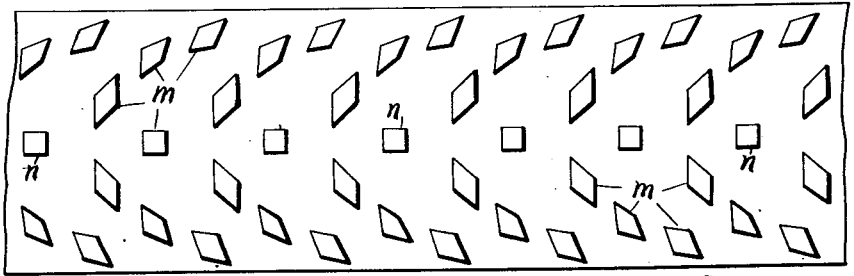
Figure 9:
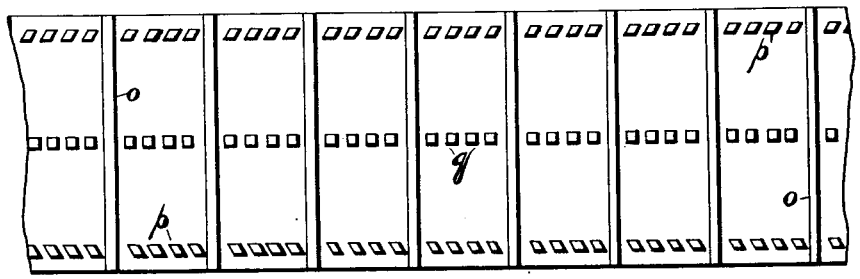
Figure 10:
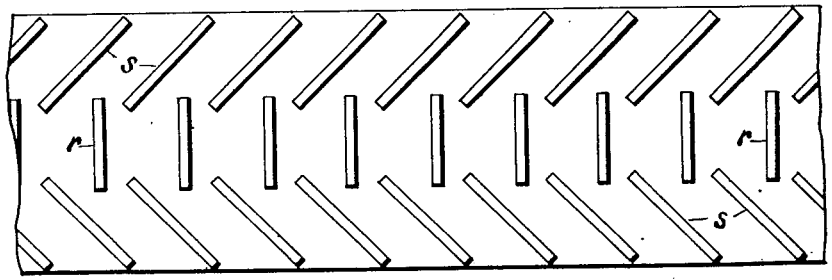

In the drawings, Figure 1 is a perspective view of the carrying-surface of one form of my improved ribbed conveyer-belt and the top troughing-idlers on which it is supported. Fig. 2 is a perspective view of the bottom or return portion of a similar belt, showing the way in which it is supported on the bottom or return idlers. Figs. 3, 4, 5, 6, and 7 are plan views of belts provided with straight or curved transverse ribs and longitudinal ribs. Fig. 8 is a plan view of a belt provided with a system of ribs made up of separate elevations or bosses, part of which are arranged in curves transverse to the belt, while others are placed in an approximately straight line at or near the middle thereof. Fig. 9 is a plan view of a belt provided with a system of ribs comprising straight transverse ribs and longitudinal ribs made up of separate elevations or bosses arranged in straight lines. Fig. 10 is a plan view of a belt provided with a system of ribs comprising straight transverse ribs which do not extend completely across the carrying-surface of the belt, but lie intermediate of the marginal edges thereof and inclined ribs extending from the lateral edges of the belt obliquely toward its middle far enough to overlap the ends of the transverse ribs; and Fig. 11 is a diagrammatic view showing the ordinary arrangement of a conveyer-belt, driving-pulley, snub-pulley, and top and bottom idlers.

Referring to the drawings, B represents a belt which may be made of canvas, of canvas faced with rubber, or of any other suitable material or materials, since the construction of the body of the belt forms no part of this invention. As shown in Figs. 1, 2, and 11, belt B is adapted for use as a conveying medium by being stretched tightly between and over end pulleys A and E, one of which, as A, is usually the driving-pulley, which imparts travel to the belt in the desired direction. For convenience belt B may be considered as composed of two portions, the upper or carrying section M and the lower, return, or idle section N, and each part of the belt will belong first to one, then to the other, of these sections as the belt travels over the end pulleys. Carrying-section M is supported upon idler-pulleys D, which in conveyers for general use are arranged to trough the belt, as illustrated in Fig. 1. Return or idle section N is supported upon return-idlers C, each of which may be composed either of one pulley or of two or more pulleys arranged in the same plane. (See Fig. 2.) Section N also passes over snub-pulley F, which, as shown in Fig. 11, is arranged to increase the area and pressure of belt contact on driving-pulley A.

As shown in all the figures of the drawings, the ribs and bosses are arranged on the belt with special reference to the accomplishment of two of the objects which have been described herein as forming an essential part of my invention: first, to furnish supports for the material carried by section M, which will prevent slippage of the material on the belt when the latter is inclined at an angle to the horizontal, and thus to make it possible for conveyer-belts to carry materials successfully when said belts are inclined at a greater angle to the horizontal than has been possible heretofore, and, second, to adapt section N to run smoothly over snub-pulley F and return-idlers G. Furthermore, since the materials used in constructing the ribs and bosses are identical with or similar to those entering into the structure of the belt itself, the ribs and bosses possess the same degree of flexibility as the belt, and they will therefore not appreciably lessen the flexibility of the whole belt, and hence will not interfere with its troughing.

Belts of the types shown in Figs. 3, 5, 6, 7, 8, and 10 are characterized by the presence of ribs and bosses, portions of which, at least, are arranged at oblique angles to the line of travel of the belt and are so disposed that when the belts are traveling in the direction indicated by the arrows said inclined ribs will serve to shift the material toward the center of the belt if any slippage of the material on the belt occurs. The belts of these forms are especially adapted for the handling of materials whose particles are somewhat regular in outline, and hence are more apt to slip on the surface of belts—such, for instance, as gravel and grain.

On the belts shown in Figs. 4 and 9 the ribs are disposed at right angles to each other and are either parallel or at right angles to the length of the belt, so that they have no effect in shifting the material carried by the belt toward the center. Such arrangements of the ribs are designed for belts used for carrying particularly rough and irregular classes of material—such, for example, as coal and ore.

As illustrated in Fig. 2, the arrangement of the ribs on my improved belt is such that when the ribbed surface of the belt passes over a pulley or pulleys only the ribs come in contact with the pulley, and as they are all of the same height the belt runs smoothly over the pulleys without jerking or slapping. This is absolutely necessary in the case of conveyer-belts for general use, in which, as has been pointed out hereinbefore, the carrying-surface of the belt must contact with both the snub pulley or pulleys and the return-idlers.

It is obvious that for a belt to run smoothly over a pulley a surface of the belt which normally lies in the same plane throughout the length of the belt must continuously contact with the pulleys, and no other surface of the belt which is not in that plane should touch the pulley in passing over it. This requirement is met in my improved belt by arranging the ribs on the carrying-surface in such a way that when the belt is inverted they will support it with all parts of the surface of the belt proper lying in the same plane even when tension is applied to the belt. Thus in Figs. 2, 3, 4, 5, 6, and 7 both margins of the return portion of the belt are supported at all times by marginal ribs $a$. In Figs. 1, 2, and 3 the parts of the belt between the margins and the center are supported by curved ribs $b$ and straight ribs $c$, one or both of which are always in contact with the pulley. In Fig. 4 these parts are supported by ribs $d$ and $e$, in Fig. 5 by $g$ and $h$, in Fig. 6 by $i$ and $j$, in Fig. 7 by $k$ and $l$.

In Figs. 8, 9, and 10 no continuous marginal ribs are shown, their place being taken in Fig. 8 by those of the bosses or elevations $m$ which are nearest the ends of the curves, in Fig. 9 by the bosses $p$ and the outer ends of ribs o, and in Fig. 10 by ribs s, which overlap, so as to furnish continuous supports. In Fig. 8 the central part of the belt is supported by both bosses n and bosses m, in Fig. 9 by bosses q and ribs o, in Fig. 10 by ribs r and the inner ends of ribs s.

On canvas belts ribs of the forms shown in Figs. 4 and 10 are preferred to those shown in the other figures, for the reason that curved ribs are necessarily more difficult to construct than straight ribs; but in belts having a carrying-surface of rubber the forms of the ribs will not greatly affect the cost thereof, because the ribs will be molded upon the surface of the belt at the time of manufacture or will be separately molded and afterward secured to the belt in any suitable manner, as by cementing or riveting. When a canvas belt is provided with transverse ribs extending entirely across the carrying-surface of the belt, it will be desirable to form the ribs out of the upper ply of the canvas composing the belt, since these ribs being integral with the carrying-surface of the belt the possibility of their becoming completely or partially detached will be greatly lessened. However, the precise manner of forming and attaching the ribs of the different types illustrated does not constitute an essential part of my invention, and no detailed description of these operations is regarded as necessary.

It will be obvious that while I have illustrated the preferred forms of embodiment of my invention the ribs may be arranged upon the belt so as to form different systems and still to accomplish the ends contemplated in this invention, the essence of which has already been pointed out.

Therefore without limiting my invention to the precise construction shown and described nor enumerating equivalents, I claim, and desire to secure by Letters Patent, the following:

1. In a belt conveyer, the combination with troughing-idlers, end pulleys and driving means, and a snub-pulley, of a conveyer-belt provided on its carrying-surface with a system of spaced ribs or elevations so arranged as to run smoothly over the snub-pulley, and prevent contact of said pulley with any portion of the belt except the ribs or elevations.

2. In a belt-conveyer, the combination with troughing-idlers, return-idlers, end pulleys and driving means, and a snub-pulley, of a conveyer-belt provided on its carrying-surface with a system of spaced ribs or elevations so arranged as to run smoothly over the return-idlers and snub-pulley, and to prevent contact of the return-idlers and snub-pulley with any portion of the belt between said ribs or elevations.

3. In a belt conveyer, the combination with a series of troughing-idlers arranged to support a belt traveling upward at an angle to the horizontal, of a conveyer-belt traveling on said idlers and provided on its carrying-surface with spaced ribs or elevations diverging forwardly from the middle of the belt.

4. In a belt conveyer, the combination with a series of troughing-idlers arranged to support a belt traveling upward in an inclined plane, of a conveyer-belt provided on its carrying-surface with a system of spaced ribs or elevations arranged to run smoothly over return-idlers, and comprising longitudinal and transverse elements embodied in ribs or elevations diverging forwardly from the middle of the belt toward the margins thereof.

5. A belt for conveyers and analogous structures, provided on its carrying-surface with a system of ribs or elevations, comprising longitudinal elements arranged to present a substantially continuous structure and transverse elements of the same height as the longitudinal elements and spaced apart.

6. A belt for conveyers and analogous structures, provided upon its carrying-surface with marginal and transverse elevations of the same height.

7. A belt for conveyers and analogous structures, provided on its carrying-surface with longitudinally-disposed elevations at the margins and in the middle of the belt, and spaced transverse elevations.

8. A belt for conveyers and analogous structures having upon its carrying-surface a system of ribs or elevations comprising longitudinal and transverse elements embodied in ribs converging from the margins of the belt to the middle thereof.

9. A belt for conveyers and analogous structures having on its carrying-surface a system of ribs or elevations comprising longitudinal and transverse elements embodied in ribs, each presenting a single curve substantially tangent at its extremities to the margins of the belt and transverse to the belt at the middle.

10. A belt for conveyers and analogous structures having on its carrying-surface a system of ribs or elevations comprising longitudinal and transverse elements embodied in marginal ribs and in ribs each presenting a single curve tangent at its ends to said marginal ribs and transverse to the belt in the middle.

11. A belt for conveyers and analogous structures having on its carrying-surface a system of ribs or elevations comprising longitudinal and transverse elements, embodied in longitudinal ribs at the margins and in the middle of the belt and in ribs each presenting a single curve tangent at its extremities to the margins of the belt and transverse to the belt in the middle.

12. A belt for conveyers and analogous structures having on its carrying-surface a system of ribs or elevations comprising marginal ribs, curved ribs tangent at their extremities to the marginal ribs and transverse to the belt in the middle, and short longitudinal ribs in the middle of the belt extending from the convexities of said curved ribs.

In testimony whereof I have signed this specification in the presence of two subscribing witnesses.

THOMAS ROBINS, JR.

Witnesses:
EMIL CHAS. EGER,
FREDERICK SCHOBER WAYNE.